No. 718,425. PATENTED JAN. 13, 1903.
W. D. CARSON.
HARNESS FOR BREAKING AND TRAINING HORSES.
APPLICATION FILED DEC. 18, 1901.
NO MODEL.
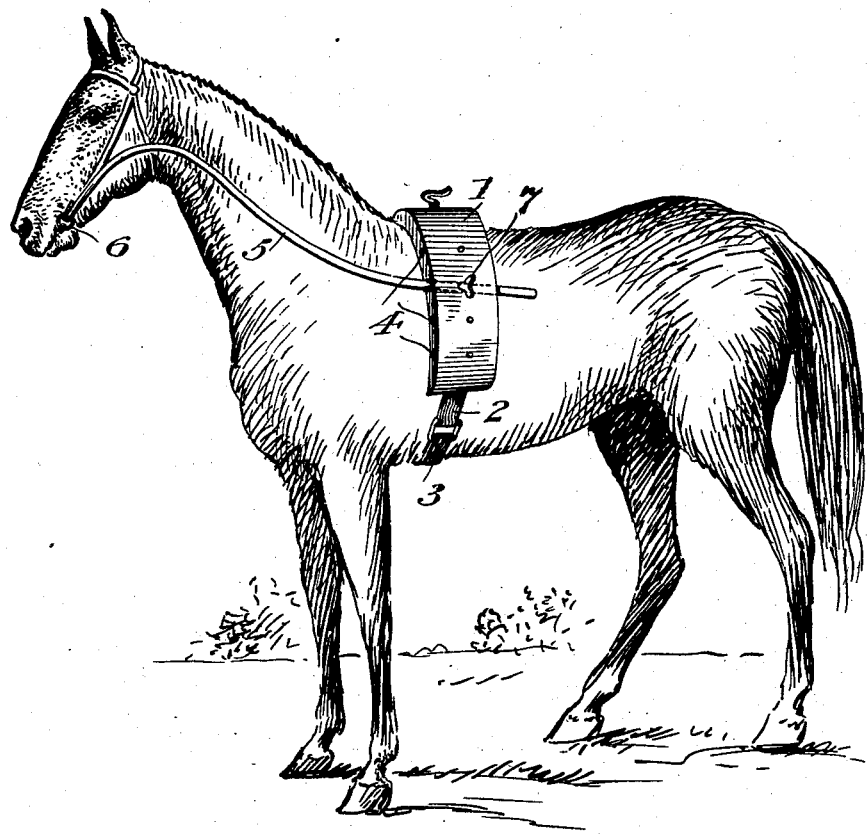
Witnesses:
Inventor:
William David Carson

UNITED STATES PATENT OFFICE.

WILLIAM DAVID CARSON, OF CENTRALIA, ILLINOIS.

HARNESS FOR BREAKING AND TRAINING HORSES.

SPECIFICATION forming part of Letters Patent No. 718,425, dated January 13, 1903.

Application filed December 18, 1901. Serial No. 86,470. (No model.)

*To all whom it may concern:*

Be it known that I, WILLIAM DAVID CARSON, a citizen of the United States, residing at Centralia, in the county of Marion and State of Illinois, have invented an Improvement in Harness for Breaking and Training Horses, of which the following is a specification.

The invention relates to a harness constructed for the purpose of breaking and training horses to carry their heads at a proper angle.

The object of my invention is to train a horse to carry his head at a graceful and proper pose and angle without the use of the ordinary overcheck and to prevent the horse from tossing his head up and down or carrying his head to one side, as is frequently done by horses reined with the ordinary overcheck or side rein.

The accompanying drawing illustrates my invention, and the several parts thereof are numbered thereon and referred to in this specification by number.

The object of my invention is accomplished by means of a saddle 1, of wood or iron attached to a back-band 2 and fastened onto a horse by the ordinary girth 3. On each side of this saddle are four horizontal holes 4. Two metal rods 5, curved to conform with the arch of a horse's neck, are adjusted with one end fastened to the bit-rings 6 on each side of the horse's head and passing along the jowl and neck with the other ends entering into the holes in the saddle, held in place by set-screws 7, and arranged so that the rods can be adjusted and the horse's head raised or lowered, held in or out, by inserting the ends of said rods in either of said holes 4 and by shortening or lengthening the same by sliding back or forward through said holes and fastening the same in the desired position by said set-screws 7.

What I claim as my invention, and desire to protect by Letters Patent of the United States, is—

A harness for breaking and training horses comprising a saddle having horizontal holes; rods slidingly mounted in said holes and connected to the bit; set-screws seated in said saddle to hold said rods adjustably in position in said holes, there being a series of said holes as required to raise or lower said rods, substantially as specified.

In witness whereof I have hereunto subscribed my name to this specification in the presence of two witnesses.

WILLIAM DAVID CARSON.

Witnesses:
W. L. KEOWN,
J. B. CHAMBERS.